United States Patent [19]

Marshall

[11] Patent Number: 4,635,820

[45] Date of Patent: Jan. 13, 1987

[54] BULK UNLOADER OF SOLIDIFIED THERMOPLASTIC MATERIAL FROM PAILS AND DRUMS

[75] Inventor: Lee Marshall, Santa Cruz, Calif.

[73] Assignee: Slautterback Corporation, Monterey, Calif.

[21] Appl. No.: 818,184

[22] Filed: Jan. 9, 1986

[51] Int. Cl.$^4$ ............................................. G01F 11/00
[52] U.S. Cl. ................................ 222/63; 222/146.5; 222/259; 222/333; 222/405; 222/340; 222/390; 187/24; 187/35; 254/98
[58] Field of Search .................... 254/98, 100; 222/63, 222/146.5, 146.2, 333, 405, 390, 259–262, 340; 187/24, 25, 35, 36

[56] References Cited

U.S. PATENT DOCUMENTS

| | | | |
|---|---|---|---|
| 2,254,317 | 9/1941 | Roberts | 222/333 |
| 2,307,060 | 1/1943 | Moore et al. | 222/63 |
| 2,800,804 | 7/1957 | Olschwang | 254/98 |
| 3,031,106 | 4/1962 | Hooker | 222/146 |
| 3,268,994 | 8/1966 | Riley | 254/98 |
| 3,282,469 | 11/1966 | Skonberg | 222/146 |
| 3,556,346 | 1/1971 | Steiner | 222/63 |
| 3,976,229 | 8/1976 | Jackson | 222/146 |
| 3,982,669 | 9/1976 | Moore | 222/146.5 |
| 4,195,755 | 4/1980 | Slautterback | 222/146 |
| 4,355,734 | 10/1982 | Moore | 222/63 |

Primary Examiner—H. Grant Skaggs
Attorney, Agent, or Firm—Thomas Schneck

[57] ABSTRACT

An apparatus for unloading heat meltable material from a container including a vertically moveable platen assembly having a platen supported by a platen carriage. The weight of the platen assembly is trapped between a balance spring which urges the platen assembly upwardly and a pressure spring which exerts a downward pressure on the platen assembly. The springs are fixed about a motor driven lead screw retaining the balance spring against the platen assembly from below and a pressure adjusting nut retaining the pressure spring against the platen assembly from above. Descent of the lead screw without an equivalent movement by the platen assembly will cause a disequilibrium in spring tensions as the balance spring expands and the pressure spring compresses. A limiting switch restricts the amount the lead screw can move after platen contact with the heat meltable material prevents further platen carriage movement. As material is dispensed the platen carriage will slowly catch up with the position of the turn screw and eventually the limit switch will once again engage, allowing the lead screw to descend some preselected incremental amount determined by the limiting switch. The apparatus also contains an applicator head safety switch activated during extended periods of nonuse. When activated, the safety switch prevents lead screw movement.

17 Claims, 4 Drawing Figures

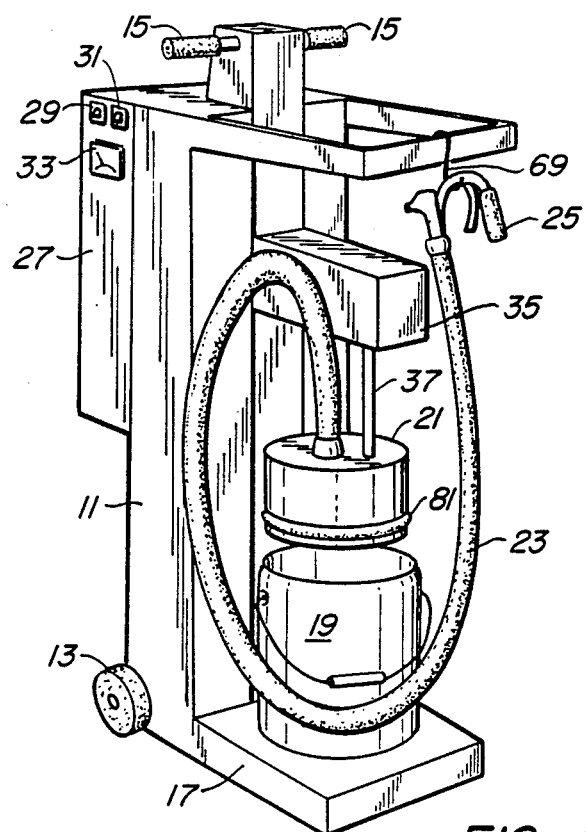
FIG._1.
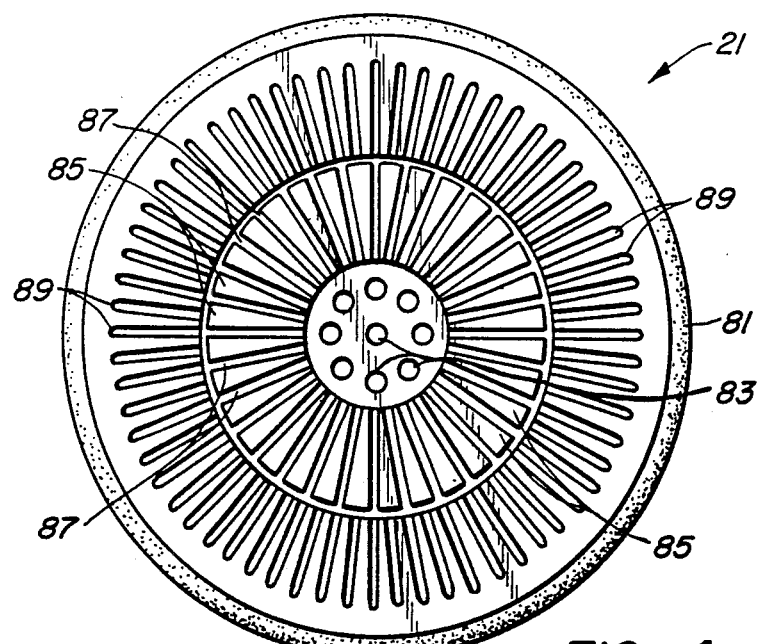
FIG._4.

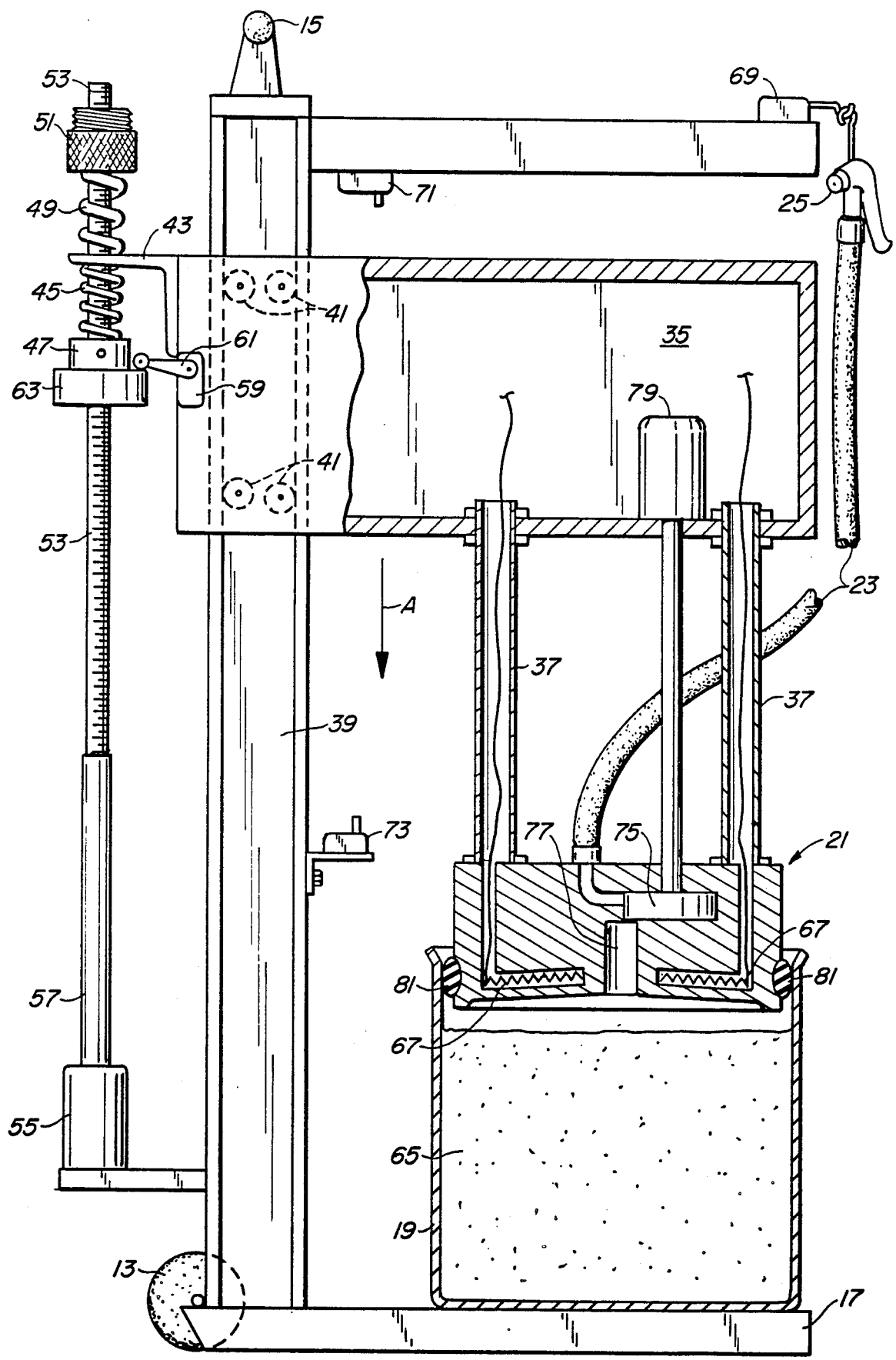
FIG._2.

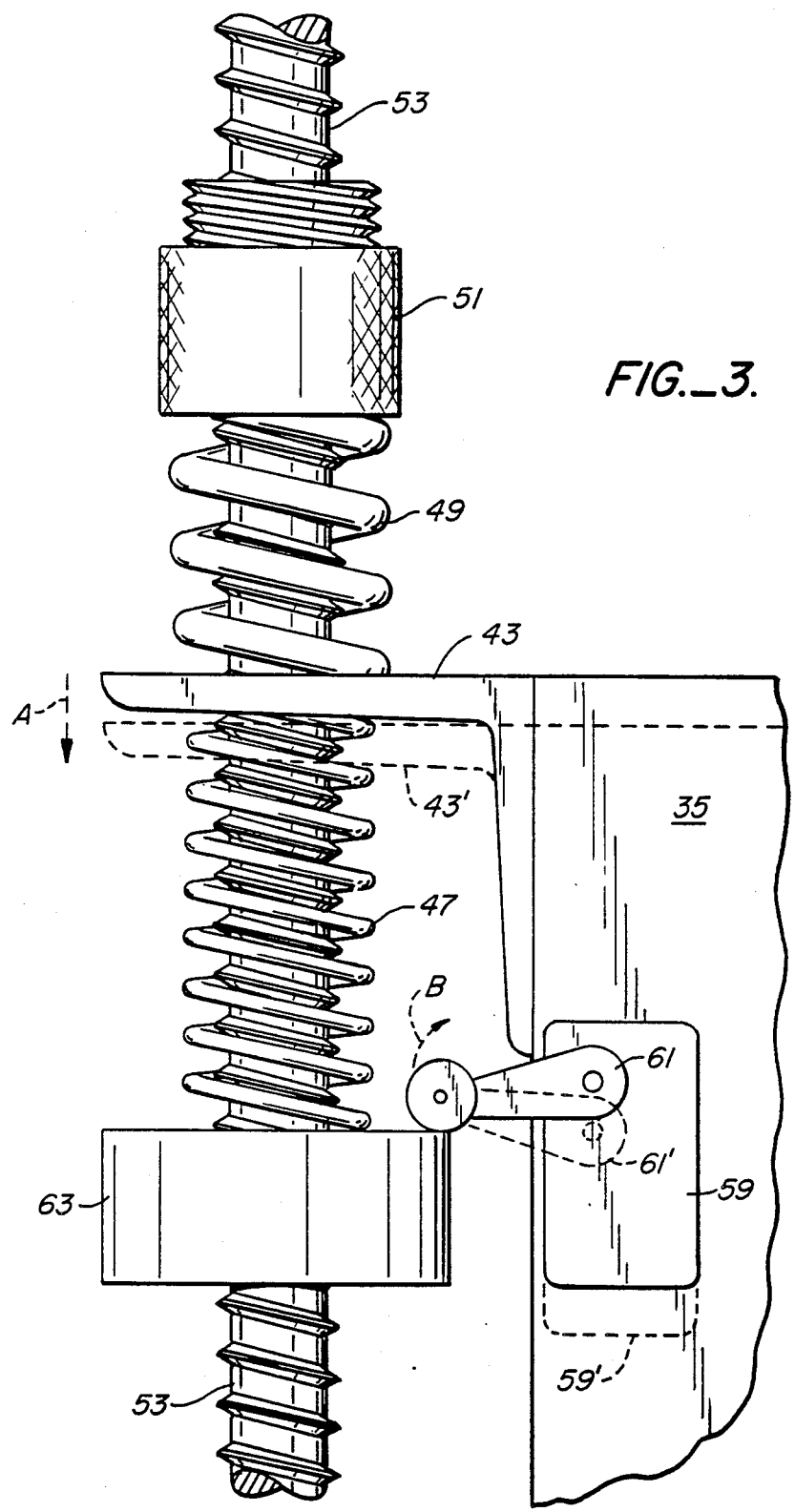
FIG._3.

BULK UNLOADER OF SOLIDIFIED THERMOPLASTIC MATERIAL FROM PAILS AND DRUMS

DESCRIPTION

1. Technical Field

The invention relates to an apparatus for unloading thermoplastic materials from a pail or drum to a dispensing head.

2. Background Art

Devices which unload completely solid hot melt or similar material from a container or barrel are known in the art. Typically, such bulk unloaders include a heated platen which is lowered into a container for melting the material in the region directly below the platen. The melted material is then pumped from the platen to some remote location.

Because the typical container for bulk hot melt or similar material is cylindrical, it is the normal practice to have a platen with a circular configuration and a resilient sealing means placed about the circumference of the platen. The seal ensures a tight fit with the inner surface of the container. The platen is lowered into the container by the force of gravity or, in some models, by air pressure.

Often the rate of melting is greater than the rate of dispensing. This is especially true when use is interrupted by periodic breaks, such as lunch hours. Under optimal conditions the sealing means prevents passage of the melted material and resistance to downward movement is sufficient to halt further movement of the platen until material is dispensed. However, the sealing means will wear as a result of excessive heat, abrasion and the like. If the sealing means is worn, the material may work its way through the worn areas to the top of the platen. Even if this leakage is discovered quickly it is still a laborious task to remove material which was able to make its way to the top of the platen, or over the top. However if the leakage is not discovered quickly, a platen may sometimes be found at the bottom of a container, covered by a number of inches of hardened adhesive.

An object of the present invention is to devise a dispenser for hot melt from pails and the like which prevents melted material from flowing from the bottom surface of the platen to the top surface.

SUMMARY OF THE INVENTION

The above object has been met by the development of a bulk dispenser which "inch-worms" the platen into a container only as the hot-melt material within the container is needed by a dispensing head. The present invention includes a platen assembly which mounts the platen to a platen carriage, with the weight of the platen assembly trapped between a balance spring and a counter-balancing pressure spring.

The balance spring provides an upward force on the platen assembly and is of sufficient strength to completely offset the weight of the carriage and platen. Conversely, the pressure spring exerts a downward force on the assembly. The difference between the forces exerted on the platen assembly by the two springs determines the movement of the platen. These forces are varied by a platen advancing means which includes a motor driven lead screw. The balance spring and pressure spring are fixed about the lead screw so that if the lead screw descends without an equivalent descent by the platen assembly, the tension from the balance spring will decrease while the tension from the pressure screw will increase. The resulting disequilibrium in spring tension pushes the platen into the container.

The lead screw is driven by a motor having a cutoff switch which is positioned so as to limit the movement of the lead screw relative to the platen carriage. That is, the limit switch causes the lead screw to gradually displace its way downward, in "inch-worm" fashion, since in most instances the lowering of the lead screw is accompanied by little or no change in the position of the platen carriage. The platen carriage does not lower because resistance of the adhesive in the container holds the platen up. The limit switch opens the circuit to the drive motor any time the lead screw moves some selectable incremental amount more than does the platen carriage. In the preferred embodiment the lead screw moves in small increments, about 0.375 inches. Then, as the adhesive is used, the carriage will start catching up to the lead screw. Eventually, the limit switch will once again engage and the motor will drive the lead screw through another incremental move.

A second cut-off switch for the lead screw drive motor is in the form of a hanger switch or a dispenser switch. When the dispenser is not in use for any extended period of time, this safety switch opens the circuit to the drive motor, disabling platen incremental advancement.

An advantage of the present invention is that it provides a cost efficient safeguard against adhesive overflow past the platen. Another advantage is that the pressure spring can be easily changed to accommodate dispensing of various materials having different viscosities. In addition, the tension of any particular pressure spring can be fine-tuned by a pressure adjusting nut which holds the spring against the platen carriage.

BRIEF DESCRIPTION OF THE DRAWINGS

FIG. 1 is perspective view showing the present invention with a container of heat meltable material.

FIG. 2 is a partial side-sectional view of the apparatus of FIG. 1.

FIG. 3 is a side view of a detail of the apparatus shown in FIG. 2.

FIG. 4 is a bottom plan view of the platen of FIG. 1.

BEST MODE FOR CARRYING OUT THE INVENTION

With reference to FIG. 1, the apparatus is mounted on a frame resembling a hand truck 11 having wheels 13 and sturdy upright members for easy maneuverability. Hand grips 15 at the top of the upright members permit the operator to tilt the apparatus backwards onto the wheels 13 whereupon the apparatus may be wheeled to the desired location.

The hand truck 11 has a base 17 which supports the container 19 of heat meltable material. The container 19 is typically a five gallon can of hot-melt adhesive but there is nothing that prevents the dispenser of FIG. 1 from being adapted to operate with containers of a different size, such as a 55 gallon drum.

As a heated platen 21 is lowered into the container 19 the adhesive begins to melt. The melted adhesive is then pumped through a hose 23 to an applicator 25.

A control panel 27 directs the operation of the dispensing procedure. The control panel may have a number of switches 29, lights 31 and meters 33. The switches 29 are used to turn the entire apparatus on and off or to operate particular parts of the apparatus, such as platen elevation, heating or pumping. The lights 31 are used to indicate conditions such as overheating. The meter 33 is used to monitor the temperature of the platen 21, which is maintained at a temperature appropriate for melting a particular type of hot-melt material.

FIG. 2 shows that the platen 21 is attached to a platen carriage 35 by two platen supports 37. The platen carriage 35 straddles an upright member, consisting of a support beam 39 with a number of wheels 41 retaining the carriage in position along the beam.

The platen assembly is made up of the platen 21, the platen carriage 35 and an inverted L-shaped bracket 43 fixed to the rear of the platen carriage. A balance spring 45 exerts an upward force on the L-shaped bracket 43. The balance spring 45 is of sufficient tension to completely offset the weight of the platen assembly. The balance spring 45 is held in place against the bracket 43.

Above the bracket 43, opposite the balance spring 45, a pressure spring 49 exerts a downward pressure on the platen assembly. A pressure adjusting nut 51 holds the pressure spring 49 in place.

A motor driven lead screw 53 provides a means for varying the forces which the balance spring 45 and the pressure spring 49 exert on the bracket 43. Providing power to a motor 55 causes the lead screw 53 to raise or lower, depending on the direction of rotation of the motor. As the lead screw lowers it disappears into sleeve 57. The lead screw is also covered by a sleeve, not shown, in order to facilitate removal of the platen assembly.

A limit switch 59 restricts the amount of lead screw movement relative to the platen assembly. That is, if the lead screw descends but the platen carriage 35 remains stationary the limit switch 59 will open the circuit to the motor 55 and, therefore, cease further movement of the lead screw. This is done by fixing the limit switch 59 to the platen carriage 35 and resting the arm 61 of the limit switch on a collar 63. Any method of attaching the limit switch actuator is satisfactory. The important factor is that the switch detect the relative motion that occurs between bracket 43 and collar 63.

Referring to FIGS. 2 and 3, the platen assembly is lowered by means of the motor 55 pulling the lead screw 53 into the sleeve 57. The platen assembly will descend until the platen 21 reaches the adhesive 65. Although movement of the platen assembly is halted by the adhesive, the lead screw 53 continues to descend. As a result, the limit switch 59 becomes stationary but the arm 61 follows the movement of the lead screw. The limit switch 59 is adjusted so as to permit fixed, incremental differences between the position of the platen assembly and the position of the collar 63. In the preferred embodiment, the lead screw 53 will drop only about 0.375 inches after the platen assembly ceases.

Because the pressure spring 49 is trapped between the bracket 43 and the pressure adjusting nut 51, movement of the lead screw without a similar movement of the platen assembly causes the pressure spring 49 to compress. Conversely, the balance spring 45 expands. As a result, there is a pressure on the platen assembly to move in the direction of arrow A, shown in phantom in FIG. 3. Then, as adhesive from the container 19 is used, the platen assembly descends. This movement brings about an expansion of the pressure spring and a compression of the balance spring. The limit switch 59 and the bracket 43 move toward a position indicated by 59' and 43'. Likewise, the arm 61 swings in the direction of arrow B toward position 61'.

Just before the tensions of the pressure spring 49 and the balance sprng 45 reach a point at which the entire weight of the platen assembly is balanced between the springs, the limit switch 59 engages and the lead screw 53 drops another 0.375 inches. Thus, the lead screw inch-worms its way downward, forcing the platen into the container. When the platen reaches the bottom of the container, the direction of the lead screw is reversed and the platen assembly is raised.

The pressure spring 49 may be replaced by removing the pressure adjusting nut 51. The pressure spring is replaceable to facilitate dispensation of various materials having different viscosities. In addition, the position of the pressure adjusting nut 51 may be altered to fine tune the tension on the pressure spring.

Besides the limit switch 59, a safety switch, such as hanger switch 69 provides a second means of opening the circuit to the lead screw motor 55. During times that the dispenser is not used for some extended period, the applicator 25 is suspended from the hanger switch 69, preventing further rotation of the lead screw 53.

An upper stop switch 71 and a lower stop switch 73 halt platen movement when the platen assembly reaches its upper and lower limits. The stop switches 71, 73 are not critical to the invention. Optionally, the lower stop switch 73 may be positioned to signal that the lower limit is close at hand and a fresh container should be prepared.

As the heated platen 21 is lowered into the adhesive 65, the heating elements 67 maintain the temperature of the platen allowing it to melt the adhesive. The platen is a solid mass of material, except for passageways, having a substantial heat capacity. For example, a twenty pound mass of aluminium heated to well over 120 F would melt most solid hot-melt adhesives. A platen structure is shown in U.S. Pat. No. 4,195,755 to Slauterback et al. A pump 75 then draws the melted adhesive through an aperture 77 in the platen 21, forcing the adhesive into hose 23. A pump motor 79 drives the pump 75. Aperture 77 provides the only exit for the adhesive since the platen is ringed by a flexible annular seal 81.

FIG. 4 illustrates the actual construction of the platen surface which contacts the adhesive. The center of the platen 21 contains a number of holes 83 through which the pump draws the adhesive. A series of triangular walls 85 define radial passages 87 to the center holes. The outside walls 89 are more numerous than the triangular walls 85. The walls 85, 89 and passages 87 channel the adhesive to the center of the platen. The annular seal 81 prevents the adhesive from passing around the platen. The seal also wipes adhesive from the sides of the container as the platen descends.

In operation, the lead screw 53 continues to drop even after the platen assembly stops. The result is that the pressure spring 49 becomes compressed while the balance spring 45 expands. However, the descent of the lead screws ceases when the limit switch 59 opens the circuit to the motor 55.

The apparatus is typical of hot melt adhesive dispensers in the sense that, optimally, further motion of the platen is prevented by contact of the adhesive against the platen and its seal. The present invention, however, contains safeguards against overflow of the adhesive beyond the annular seal 81. If the applicator 25 is placed on the hanger switch 69 the lead screw cannot descend and, therefore, the platen assembly will not drop beyond a position where the balance spring 45 supports the entire weight of the assembly. Alternatively a safety switch could be mounted in the dispenser gun, such as in the handle. When the handle is released, as when the gun is put down, the motor is cut off. This safety switch disables platen advancement when there is no possibility of demand for hot melt material.

Even if the operator leaves the application off the hanger switch, the majority of accidental overflows are avoided. Instead of using gravity or air pressure to push the platen into the adhesive, the present invention has a pressure spring which applies a varying amount of downward force. Just before the limit switch 59 engages, the downward force is relatively light. At that point the adhesive will work its way around the seal only if the deterioration of the seal is severe. Thus, the platen is not likely to dive more than 0.375 inches and the cost of digging a platen out of the bottom of a container still filled with adhesive is averted.

While the invention has been described with reference to unloading a pail or other container of solidified adhesive hot-melt material, other thermoplastics may be similarly unloaded.

I claim:

1. An apparatus for unloading solidified thermoplastic material such as hot-melt, from a container, comprising,
    a movable platen assembly having a first vertical axis of movement, said platen assembly having a platen carriage, said platen carriage supporting a heated platen having a means for pumping melted thermoplastic material from a container,
    a vertically movable advancing means for moving said platen assembly, said advancing means having a second vertical axis of movement parallel to the first vertical axis and having a pressure means for urging said platen assembly downwardly and a balance means for urging said platen assembly upwardly, and
    a limiting means for restricting vertical movement of said advancing means relative to vertical movement of said platen carriage to preselected incremental advances.

2. The apparatus of claim 1 wherein said pressure means is a variable downwardly biased spring on said platen assembly and said balance means is a variable upwardly biased spring on said platen assembly, said advancing means including a lead screw and a means for maintaining said downwardly biased spring and upwardly biased spring on the platen assembly.

3. The apparatus of claim 2 wherein an adjustable nut retains said downwardly biased spring in contact with said platen assembly.

4. The apparatus of claim 1 having a safety switch and an applicator member connected to said means for pumping melted material, said safety switch adapted to disable said platen assembly advancing means, thereby preventing movement of the advancing means.

5. The apparatus of claim 1 wherein said limiting means is a limit switch having an activation arm for sensing and controlling vertical movement of the advancing means.

6. The apparatus of claim 1 wherein said preselected incremental advances are in the range of 0.25 inches to 0.5 inches.

7. An apparatus for unloading solidified thermoplastic material, such as hot-melt, from a container, comprising,
    a heated platen having a means for pumping melted thermoplastic material from a container,
    a vertically movable platen carriage, said platen carriage supporting said platen,
    a vertically movable advancing means having a balance means and a pressure means, said balance means associated with a variable upward bias for urging said platen carriage upwardly, said pressure means associated with a variable downward bias for urging the platen downward, opposed in motion to said balance means, and
    a limiting means for restricting movement of said advancing means relative to the platen carriage to preselected incremental advancements.

8. The apparatus of claim 7 wherein said advancing means includes a motor driven lead screw, said balance means and pressure means fixed about said lead screw whereby turning of said lead screw relative to said platen carriage operatively changes the opposition between said pressure means and the balance means.

9. The apparatus of claim 8 wherein said pressure means is a pressure spring.

10. The apparatus of claim 8 wherein said balance means is a balance spring with sufficient spring force to support said platen and said platen carriage.

11. The apparatus of claim 7 having a vertical beam as part of a support frame, said platen carriage being slideably mounted to said beam.

12. The apparatus of claim 7 wherein said limiting means is a limit switch having an activation arm and a switch body, one of said activation arm and switch body fixed to said platen carriage with the other seated on said advancing means.

13. An apparatus for unloading solidified thermoplastic material from a container comprising,
    a vertically movable heated platen assembly having a platen adapted to enter a container for contacting thermoplastic material therein, said platen having an upper surface and a lower surface and a means for heating, melting and pumping melted material from the lower surface through the upper surface,
    a pressure means coupled with said platen assembly for urging the platen assembly downwardly with a variable downward force,
    a balance means coupled with said platen assembly for urging the platen assembly upwardly with a variable upward force,
    an advancing means coupled with said pressure means and said balance means for varying said downward force and simultaneously varying said upward force, thereby determining th direction of platen assembly movement, and
    a limiting means coupled with said advancing means, said limiting means restricting variations of said downward force and said upward force to preselected incremental advances.

14. The apparatus of claim 13 wherein said pressure means is a pressure spring and said balance means is a balance spring.

15. The apparatus of claim 13 wherein said advancing means includes a vertical motor driven lead screw.

16. The apparatus of claim 15 wherein said preselected incremental advances are in the range of 0.25 inches to 0.5 inches.

17. The apparatus of claim 15 having a safety switch and an applicator member connected to said means for pumping melted material, said safety switch capable of disabling said platen assembly advancing means thereby preventing movement of said advancing means.

* * * * *